(12) United States Patent
Nakazawa et al.

(10) Patent No.: US 9,778,913 B2
(45) Date of Patent: Oct. 3, 2017

(54) METHOD OF GENERATING UNIFORM AND INDEPENDENT RANDOM NUMBERS

(71) Applicants: Hiroshi Nakazawa, Osaka (JP); Naoya Nakazawa, Osaka (JP)

(72) Inventors: Hiroshi Nakazawa, Osaka (JP); Naoya Nakazawa, Osaka (JP)

(*) Notice: Subject to any disclaimer, the term of this patent is extended or adjusted under 35 U.S.C. 154(b) by 0 days.

(21) Appl. No.: 15/065,549

(22) Filed: Mar. 9, 2016

(65) Prior Publication Data
US 2016/0328210 A1 Nov. 10, 2016

Related U.S. Application Data

(63) Continuation-in-part of application No. 14/139,832, filed on Dec. 23, 2013, now abandoned.

(30) Foreign Application Priority Data

Jul. 8, 2013 (JP) .................. 2013-142225
Oct. 2, 2013 (JP) .................. 2013-206947

(51) Int. Cl.
*G06G 7/58* (2006.01)
*G06F 7/58* (2006.01)

(52) U.S. Cl.
CPC .................. *G06F 7/586* (2013.01)

(58) Field of Classification Search
CPC .............................. G06F 7/58–7/586
See application file for complete search history.

(56) References Cited

U.S. PATENT DOCUMENTS

| | | |
|---|---|---|
| 8,443,021 B2 | 5/2013 | Nakazawa et al. |
| 2012/0290632 A1 | 11/2012 | Nakazawa et al. |
| 2014/0337399 A1 | 11/2014 | Nakazawa et al. |
| 2015/0012579 A1* | 1/2015 | Nakazawa .............. G06F 7/586 708/250 |
| 2015/0169290 A1 | 6/2015 | Nakazawa et al. |

OTHER PUBLICATIONS

Fishman, G.S., and Moore, L.S., III., "An exhaustive analysis of multiplicative congruential random number generators with modulus 2 2^31-131-1", SIAM Journal on Scientific and Statistical Computing, v.7 n. 1, pp. 24-45, 1986.*

Nakazawa, Naoya, et al, "Computational Progress in Spectral Tests of Multiplicative Congruential Generators for Uniform and Independent Random Numbers Realized by Moduluses Formed with Two Odd Primes," <http://www10.plala.or.jp/h-nkzw/computable.pdf>, Oct. 26, 2012, 7 pages.

(Continued)

*Primary Examiner* — Matthew Sandifer
(74) *Attorney, Agent, or Firm* — Blakely, Sokoloff, Taylor & Zafman LLP

(57) ABSTRACT

For any multiplicative congruential generator (d, z) with an odd modulus d and a multiplier z coprime to d, a computationally innovative method is presented as specialized forms of 2nd degree spectral tests of (d, z^i) with $2 \leq i \leq 6$, at the least. Providing with sharp and powerful sieving tools, the method enables the excavation of the integer set (d, z) as a generator of uniform and independent random numbers of excellent statistics with sufficiently long periods for simulations, and furnishes the selected generator with ways of clear, unambiguous and quantitative specifications of its performance.

6 Claims, 3 Drawing Sheets

(56) References Cited

OTHER PUBLICATIONS

Nakazawa, Naoya, et al, "Multiplicative Congruential Generators with Moduluses Farmed by Two Odd-Prime-Factors for Uniform and Independent Random Nos. I. Computational Analysis of Structures," <http://www10.plala.or.jp/h-nkzw/revpopesq1.pdf>, Oct. 31, 2012, 15 pages.
Wang, Miao, et al, "Combined Random Number Generators: A Review," IEEE $3^{rd}$ International Conference on Communication Software and Networks (ICCSN), May 27-29, 2011, pp. 443-447.
L'Ecuyer, Pierre, et al, "Structural Properties for Two Classes of Combined Random Number Generators," Mathematics of Computation, Oct. 1991, vol. 57, No. 196, pp. 735-746.
Sakamoto, Munetaka, et al, "Combination of Multiplicative Congruential Random Number Generators with Safe Prime Modulus," Proceedings of the 1995 Winter Simulation Conference, IEEE, Dec. 3-6. 1995, pp. 309-315.
Nakazawa, Hiroshi, et al, "Designs of Uniform and Independent Random Numbers with Long Period and High Precision," <http://www10.plala.or.jp/h-nkzw/>, Mar. 9-Jul. 8, 2008, 38 pages.
Fishman, George S, "Multiplicative Congruential Random Number Generators with Modulus $2^{\beta}$: An Exhaustive Analysis for $\beta=32$ and a Partial Analysis for $\beta=48$," Mathematics of Computation, Jan. 1990, vol. 54, No. 189, pp. 331-344.

\* cited by examiner

[Figure1]
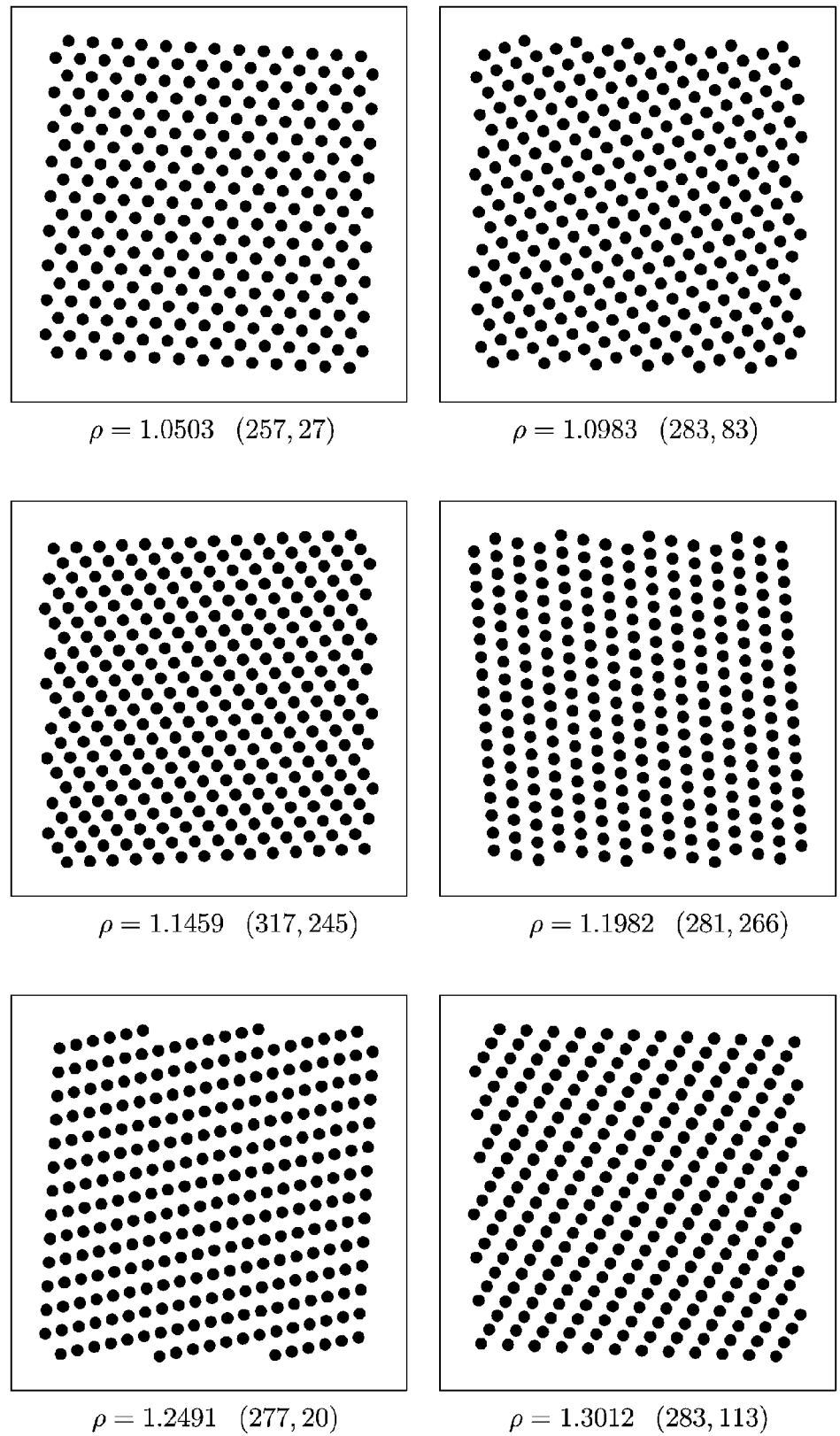

[Figure2]
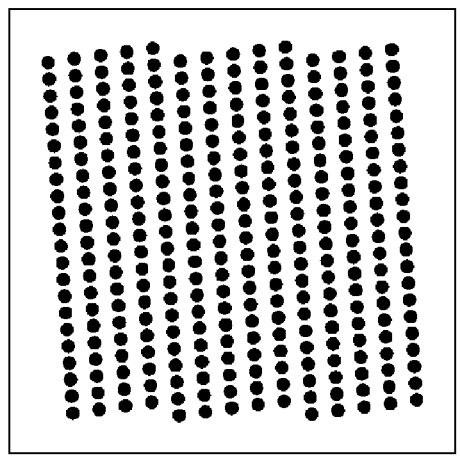
$\rho = 1.3501 \quad (311, 297)$
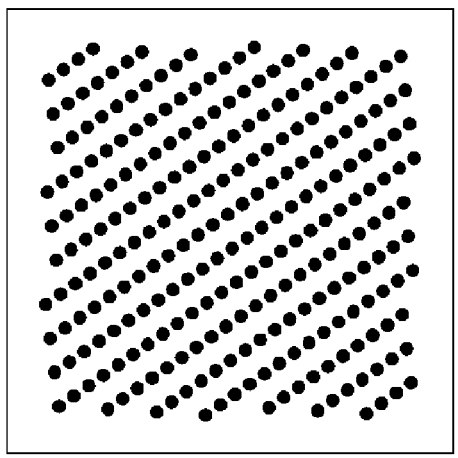
$\rho = 1.3947 \quad (251, 76)$
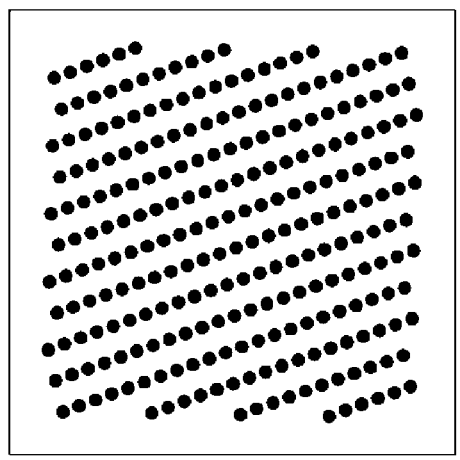
$\rho = 1.4547 \quad (251, 46)$
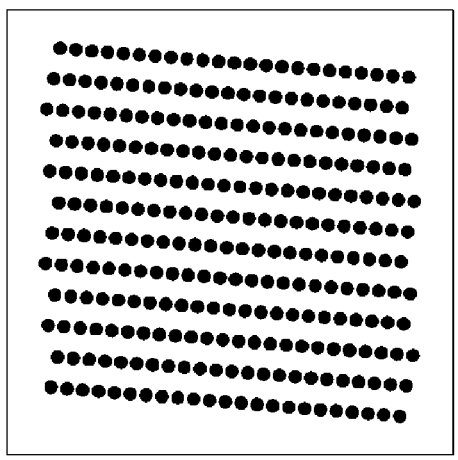
$\rho = 1.4959 \quad (281, 117)$
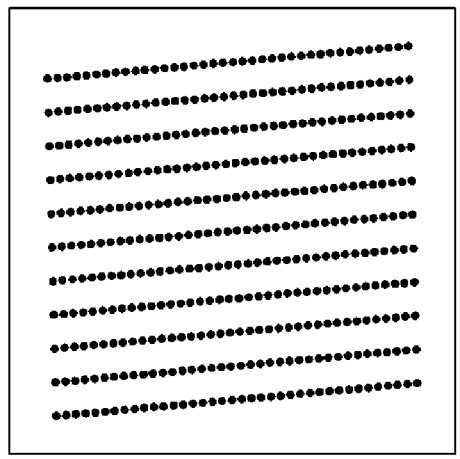
$\rho = 1.9915 \quad (419, 381)$
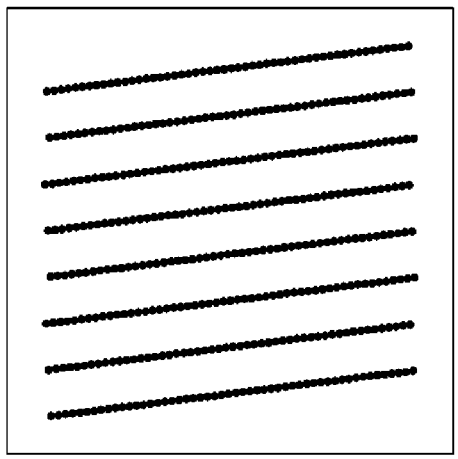
$\rho = 2.7283 \quad (419, 262)$

[Figure 3] Extended Spectral Tests on Fishman and Moore (1986)

A. z=742938285

|     | 2nd | 3rd | 4th | 5th | 6th |
| --- | --- | --- | --- | --- | --- |
| a | 0.8673 | 0.8607 | 0.8627 | 0.8320 | 0.8342 |
| 1/a | 1.1530 | 1.1618 | 1.1592 | 1.2019 | 1.1988 |
| b | 1.15306751 | 1.16186656 | 1.15915450 | 1.20199716 | 1.19882541 |
|  | 2nd of $z^2$ | 2nd of $z^3$ | 2nd of $z^4$ | 2nd of $z^5$ | 2nd of $z^6$ |
| c | 1.91805599 | 1.81316446 | 1.32378868 | 3.25782855 | 1.04479227 |

B. z=950706376

|     | 2nd | 3rd | 4th | 5th | 6th |
| --- | --- | --- | --- | --- | --- |
| a | 0.8574 | 0.8985 | 0.8692 | 0.8337 | 0.8274 |
| 1/a | 1.1663 | 1.1130 | 1.1505 | 1.1995 | 1.2086 |
| b | 1.16627569 | 1.11291561 | 1.15054146 | 1.19946130 | 1.20856552 |
|  | 2nd of $z^2$ | 2nd pf $z^3$ | 2nd of $z^4$ | 2nd of $z^5$ | 2nd of $z^6$ |
| c | 1.19708825 | 6.76681886 | 1.46420589 | 5.00940631 | 2.26206864 |

C. z=1226874159

|     | 2nd | 3rd | 4th | 5th | 6th |
| --- | --- | --- | --- | --- | --- |
| a | 0.8411 | 0.8787 | 0.8255 | 0.8378 | 0.8441 |
| 1/a | 1.1889 | 1.1380 | 1.2114 | 1.1936 | 1.1847 |
| b | 1.18893209 | 1.13803984 | 1.21140770 | 1.19360615 | 1.18426026 |
|  | 2nd of $z^2$ | 2nd of $z^3$ | 2nd of $z^4$ | 2nd of $z^5$ | 2nd of $z^6$ |
| c | 3.51885751 | 2.19846315 | 1.15368543 | 1.47158421 | 1.48916585 |

D. z=62089911

|     | 2nd | 3rd | 4th | 5th | 6th |
| --- | --- | --- | --- | --- | --- |
| a | 0.8930 | 0.8903 | 0.8575 | 0.8630 | 0.8249 |
| 1/a | 1.1198 | 1.1232 | 1.1662 | 1.1587 | 1.2123 |
| b | 1.11986188 | 1.12320242 | 1.16615693 | 1.15876257 | 1.21227975 |
|  | 2nd of $z^2$ | 2nd of $z^3$ | 2nd of $z^4$ | 2nd of $z^5$ | 2nd of $z^6$ |
| c | 1.79072973 | 1.44118579 | 1.20332225 | 1.17058675 | 1.63022644 |

E. z=1343714438

|     | 2nd | 3rd | 4th | 5th | 6th |
| --- | --- | --- | --- | --- | --- |
| a | 0.8237 | 0.8324 | 0.8245 | 0.8262 | 0.8255 |
| 1/a | 1.2140 | 1.2013 | 1.2129 | 1.2104 | 1.2114 |
| b | 1.21411121 | 1.20130010 | 1.21290241 | 1.21035116 | 1.21145141 |
|  | 2nd of $z^2$ | 2nd of $z^3$ | 2nd of $z^4$ | 2nd of $z^5$ | 2nd of $z^6$ |
| c | 1.99192650 | 1.45479150 | 1.13241226 | 1.56904222 | 1.04455900 |

US 9,778,913 B2

METHOD OF GENERATING UNIFORM AND INDEPENDENT RANDOM NUMBERS

CROSS-REFERENCE TO RELATED APPLICATIONS

This application is a continuation-in-part of U.S. patent application Ser. No. 14/139,832, filed Dec. 23, 2013, which is incorporated by reference herein in its entirety, which claims priority under 35 U.S.C. §119(a) to Japanese Patent Application No. 2013-142225, filed Jul. 8, 2013, and Japanese Application No. 2013-206947, filed Oct. 2, 2013.

FIELD

The subject matter disclosed herein related generally to random number generators

BACKGROUND

The following has been showed. Consider any sample sequence of a finite length T, $S_T:=\{u_k|k=1, 2, \ldots, T, 0<u_k<1\}$ of arbitrary uniform random numbers to be realized on a computer. Then there necessarily exists a multiplicative congruential generator (d, z, n), with its output $S:=\{v_k|k=1, 2, \ldots, 0<v_k<1\}$ with elements approximating those of $S_T$ uniformly as $|u_k-v_k|<1/d$ for any k. This apparently surprising fact stems from all-plain, fundamental structures of our arithmetic of division of an integer n by an integer d with the base z. Yet its implications are fundamental to random number generation problems. First of all, it justifies us to concentrate solely on the design of a multiplicative congruential generator (d, z, n). Second, it erases metaphysical problems, which will arise if we choose the way to doubt whether or not we can generate a random sequence by a deterministic, recursive congruence relations. The simple way out is for us to concentrate only on a solvable technological problem to find a (d, z, n) generator that denies most weakly the statistical hypothesis that the generated sequence S is a sample of uniform and independent random number sequence. The way of thinking gives us great conveniences of spectral tests, which are unambiguous, clear and quantitative way to assess properties (in particular, the independence) of generated random number sequences. It should of course be reminded that, though the said inference ensures any finite portion $S_T$ of a uniform random number sequence to admits spectral tests via its approximating multiplicative sequence S, the identification of the modulus d and the multiplier z will generally be highly difficult if we start from $S_T$. The practical possibility of spectral tests is limited to random number sequences generated by multiplicative congruential way to start with. We should further be conscious that the technology never allows us to examine all multiplicative congruential generators. Nevertheless, said clear perspective is encouraging. We may strive along the line of multiplicative congruential way, though only with the setting of a modulus d composed of a prime or two or of their powers adequate for our computing facilities, a multiplier z consisting of primitive roots or of their negatives. The present invention is a report, so to say, that our humble efforts in fact were successful and rewarded by some finite number of excellent generators.

BRIEF DESCRIPTION OF THE DRAWINGS

FIG. 1 illustrates a plot of consecutive 2-tuples emitted from (d, z) generators of one embodiment.

FIG. 2 illustrates plots of consecutive 2-tuples emitted from (d, z) generators of another embodiment.

FIG. 3 illustrates a listing of the performance of the top 6 generators chosen by Fishman and Moore (1986) for the Mersenne prime modulus $d=2^{31}-1$.

DETAILED DESCRIPTION

This invention is concerned with a new method to produce an excellent multiplicative congruential generator (d, z, n) for uniform and independent random numbers, which comprises an integer d for the modulus, an integer z coprime with d for the multiplier and an integer n coprime with d for the seed, starts from the initial value $$r_0:=n \bmod(d), 0<r_0<d$$

emit recursively $$r_k:=zr_{k-1} \bmod(d), 0<r_k<d, k=1,2,\ldots,$$

and realize the arithmetic $\{v_k:=r_{k-1}/d|k=1, 2, \ldots\}$ to output the sequence $S:=\{v_1, v_2, \ldots\}$ as a sample process of uniform and independent random numbers. The technological aim is to realize the sequence S with a sufficiently long period T, with the statistical excellence as consisting of uniform and independent random numbers and, last but not least with the clear and quantitative specifications of their performance. Since the seed n is not relevant to the statistical properties of S, we often denote (d, z, n) as (d, z).

General Structures of (d, z, n) Sequences with Composite Modulus d

The sequence $S':=\{r_0, r_1, r_2, \ldots\}$ of integers generated by a (d, z, n) generator may be denoted as follows:

$$S':=\{n, nz, nz^2, nz^3, \ldots\} \bmod(d).$$

In the special case that $d=d_1d_2$ is a product of coprime factors, terms of the original (d, z, n) sequence S' is reconstructed modulo d uniquely from sequences modulo $d_1$ and $d_2$ in the following form by Sun Tzu's theorem with $z_j:\equiv z \bmod (d_j)$ and $n_j:\equiv n \bmod (d_j)$ for j=1, 2:

$$nz\hat{}i \equiv R_1 n_1(z_1)\hat{}i + R_2 n_2(z_2)\hat{}i (\bmod d), i=0,1,2,3,\ldots.$$

Here $R_1$ and $R_2$ are integers determined solely by mutually coprime $d_1$ and $d_2$, and have the property $$R_j \equiv \delta_{jk} \bmod(d_k), j,k=1,2.$$

They may be taken as follows with the help of the Euclidean equation for the greatest common divisor $GCD(d_1, d_2)=1=D_1d_1+D_2d_2$, $$R_1:=D_2d_2(\bmod d), R_2:=D_1d_1(\bmod d).$$

Since integers $R_1$, $R_2$ do not depend on $(z_1)\hat{}i$, $(z_2)\hat{}i$, we may say with a decomposition of the modulus $d=d_1d_2$ into coprime factors that the (d, z, n) sequence is the shuffling of subsequences given by $(d_1, z_1, n_1)$ and $(d_2, z_2, n_2)$. This structure enables us to grasp that the period T of the (d, z, n) generator is the least common multiple of periods of sub-generators $(d_1, z_1, n_1)$ and $(d_2, z_2, n_2)$, and also brings us to an important, intuitive comprehension: If sub-generators $(d_1, z_1, n_1)$ and $(d_2, z_2, n_2)$ have the excellence as generators of uniform and independent random numbers, then the resultant (d, z, n) random numbers will have good chances to be excellent in spectral tests. This overview is the fundamental motive underlying the present invention, and our pleasure is to report that the suggested strategy is successful. On detailed explanations of successful trials, we present here the invention as the outstanding method to find (or produce) excellent uniform and independent random number generators.

Requisites of Usable Periods in Practical Problems

We reflect first on fundamental technological requisites on random number sequences in our present simulations. Let us start from the classic Mersenne prime $d=2^{31}-1$ for the modulus, and consider a primitive root z of d for the multiplier with the arbitrary seed n in $0<n<d$. The period is then $T=\phi(d)=d-1\approx 2^{31}$ with the Euler's function $\phi$. Since T is even, there arises $z^{(T/2)}=-1$ mod(d), and the first and the second halves of output integer sequence read $$S'=\{nz^0, nz^1, nz^2, \ldots, nz^{(T/2-1)}\} \equiv \{n, nz, nz^2, \ldots\} \mod(d),$$

$$S''=\{nz^{(T/2)}=-nz^0, -nz^1, -nz^2, \ldots\} \equiv -S' \mod(d).$$

The second half S'' is simply the negative of the first half, and its elements cannot be used for independent random numbers. We should say that the usable period T' of a prime-primitive root generator is $T'=T/2$; in the present case $T'\approx 2^{30}$. It is easy to confirm on our desktop computer (say, a machine with Intel Core I7-4773@3.40 GHz) that the simplest single precision random number sequence $$\{v_k = r_k/d \mid r_k \equiv z^k \mod(d), 0 < r_k < d, k = 0, 1, \ldots, T'\}$$

is generated within 28 seconds. Therefore, this Mersennne prime modulus generator is now not suitable even on our desktop personal computers. If, however, the usable period can be made as large as $T'\approx 2^{50}\approx d/2$ by increasing d to $2^{51}$, then the usable random number sequence will require more than 340 days for its generation. This is a moderate estimate that neglects difficulties to arise with the usual integer*8 arithmetic in our present desktop computers. The prospect is that a random number generator with the usable period $T'\approx 2^{50}$ with the associated precision as real*8 will be safe even on large-scale computers of our day. Therefore, the present technological aim is to realize a multiplicative congruential generator (d, z, n) that has the usable period as large as $T'\approx 2^{50}$, gives outputs in double precision and, last but not least, show excellent independence of its consecutive random numbers. The technological problem to realize such a generator is not a design. It should be said to be expeditions to find extremely rare sets of large coprime integers (d, z). As Fishman and Moore established as early as (1986), the sole reliable weapon available to us is the set of spectral tests, and they should be exhaustive. Namely, we cannot have any expectation that a certain types of integers will be hopeful as the multiplier; we can only examine all possible candidates one after another until we find a passer. This is a pile of shortest vector problems, and difficult to compute within a reasonable time. However, multiplicative congruential generators have a natural graded structure clarified by Sun Tzu's theorem. The present invention is a report that a certain type of our devices work effectively, and enable us to find noted rare integer sets for excellent generators within a realistic computable time. Once an excellent set (d, z) is found with $d\approx 2^{51}$, then it is an easy task to confirm its excellence, and to mount it in computers. With pleasure, we report how a successful set of devices may be given, and what are the technological realities with them.

Generalized 2nd Degree Spectral Tests

If a sequence of random numbers have excellent independence, it may be used easily for any non-excellent roles by transformations. Since the converse is entirely untrue, a general-purpose random number generators on computers should be a multiplicative congruential generator (d, z, n) with a sufficiently long period and with excellent qualification as a generator of independent random numbers. Let $\{u_1, u_2, \ldots\}$ denote a sequence of uniform and independent random numbers in the strict mathematical sense of stochastic processes. Then real random numbers $u_k$ and $u_{k+i}$ for $i=1, 2, \ldots$ should be independent. This fact is translated to a simple property in the multiplicative congruential sequence $\{v_1, v_2, \ldots\}$, generated by a (d, z, n) generator approximating the original sequence extremely closely as $|u_k - v_k| < 1/d \approx 2^{-51}$ uniformly for $k = 1, 2, \ldots$. Namely, the generator (d, $z^i$, n) should also give random number sequence with excellent independence for indices $i = 1, 2, \ldots$. The test for $i=1$ is in the usual 2nd degree spectral test. We present here a claim as the invention that generalized 2nd degree tests of (d, $z^i$, n) for cases $i = 2, 3, \ldots$ should also be performed to find excellent generators, to sieve out unqualified generators and, so to say, to make incomputable 3rd to 6th degree spectral tests computable. Such tests might well appear all easy, commonplace and useless. But they in fact realize incomparably swift tests, and surprise us with their sharp and powerful abilities.

Explanations on 2nd Degree Spectral Tests

Let $\{r_0, r_1, \ldots\}$ be the integer sequence underlying the multiplicative congruential random numbers $\{v_1, v_2, \ldots\}$ generated by (d, z, n). The basis of 2nd degree spectral tests is the following. Regard the consecutive 2-tuples $(r_k, r_{k+1})$ for $k = 0, 1, 2, \ldots$ taken out of $\{r_0, r_1, \ldots\}$ as points in the Euclidean plane $E_2$. Then they form lattice points of a lattice $G_2(d, z)$ in the plane $E_2$ determined by d and z. The proof is easy. If we disregard modulo d, the noted 2-tuple is $(nz^k, nz^{k+1})=nz^k(1, z)$, so that it is an integral multiple of the vector $e_1:=(1, z)$. Modulo d arithmetic translates the coordinates of this vector by multiples of d. To the 2nd axis this translation is effected by an integral multiple of $e_2:=(0, d)$. To the first axis the same role is played by $e_1':=(d, 0)=de_1-ze_2$. Therefore, points of consecutive 2-tuples are all expressed by integral linear combinations of $\{e_1, e_2\}$. The state of matter may be said that they are all in a lattice $G_2(d, z)$ spanned by basis vectors $\{e_1, e_2\}$ determined by integers d and z. We may also say that consecutive 2-tuples of random numbers from (d, z) take seats in lattice points of the lattice $G_2(d, z)$; note that seats with coordinates which are multiplies of d can never be occupied. The set of basis vectors of $G_2(d, z)$ admits various expressions, as unimodular transformations of $\{e_1, e_2\}$. Any such set of basis vectors has one and the same determinantal area d/2. Triangles (or 2-simplexes) they span can have various forms. The form of a regular triangle (regular 2-simplex), defined geometrically uniquely by the equidistant configuration of vertices, is among them, and it is manifestly the unique ideal as seats for consecutive 2-tuples of strictly uniform and independent random number sequence. The closeness of the geometry of $G_2(d, z)$ may be measured by the so-called largest distance $\lambda_2(d, z)$ between parallel and neighboring lattice lines of $G_2(d, z)$. A lattice line is any line connecting two lattice points. Two parallel lattice lines are neighboring if they have no other parallel lattice line between them. If a lattice in the plane has a set of basis vectors forming a regular triangle (or a regular 2-simplex), then it is called the triangular lattice. The following conclusion has been established in the Geometry of Numbers and used by Fishman and Moore (1986).

(Theorem)
The largest distance $\lambda_2(d, z)$, between parallel and neighboring lattice lines for any $(d, z)$ lattice $G_2(d, z)$ spanned by basis vectors forming the determinantal area $d/2$, has the lowest bound $\overline{\lambda}_2(d)=2^{-1/2}3^{1/4}d^{1/2}\approx 0.93060d^{1/2}$ given by that of a triangular lattice, $\lambda_2(d, z)\geq \overline{\lambda}_2(d)=2^{-1/2}3^{1/4}d^{1/2}\approx 0.93060d^{1/2}$. (End of Theorem)

An elementary proof of this theorem may be seen in Nakazawa and Nakazawa (2015a). The largest distance cannot satisfy the equality $\lambda_2(d, z)=\overline{\lambda}_2(d)$, because the lattice $G_2(d, z)$ has lattice points with integer coordinates while the triangular lattice requires irrational coordinates for its lattice points.

The above theorem of the Geometry of Numbers lead Fishman and Moore (1986) to define the following criterion that a $(d, z)$ generator is passable in the 2nd degree spectral tests:

$$1<\rho_2(d,z):=\lambda_2(d,z)/\overline{\lambda}_2(d)<1.25.$$

The discovery of this criterion marks an everlasting monument in random number problems. Though spectral tests with degrees greater than 2 were revised to more adequate forms by Nakazawa and Nakazawa (2014a), the 2nd degree criterion noted above and the value 1.25 will ever retain their versatile roles in spectral tests. In particular, the 2nd degree spectral tests are in fact very sharper and more powerful than what we all have conceived of. In order to go into this core of the present invention, we see first typical plots of consecutive 2-tuples of random numbers emitted by prime-primitive root generators $(d, z)$ that realize $\rho: =\rho_d^{(2)}(z)\approx 1.10$, 1.15, 1.20, ..., 2.50, respectively. A glance of these plots will at once convince us of the adequacy of the criterion of Fishman and Moore.

As already said, there exist important and powerful criteria for the integer sequence $\{r_0, r_1, r_2, \ldots\}$ emitted from the $(d, z, n)$ generator to be excellent as uniform and independent random numbers. In our present terminology it may be written down as $$1<\rho_2(d,z\hat{\,}i)<1.25,\ 2\leq i\leq 6.$$

Inventors claim the priority of 2nd degree spectral tests based on these criteria, calling it as the generalized 2nd degree spectral tests. There are 2 remarkable advantages of the method of these generalized 2nd degree spectral tests.
(1) The method provides a powerful sieve, working with the smallest amount of computation, to exclude inappropriate $(d, z)$.
(2) The method diminishes drastically the computational amount of the search in exhaustive spectral tests needed to find excellent $(d, z)$ generators.

The best way to comprehend (1), noted above, will be obtained by examples. FIG. 3 shows performances in the extended 2nd degree spectral tests of top 5 primitive root multipliers for the Mersenne prime modulus $d=2^{31}-1$ found by Fishman and Moore (1986). The lists reproduce their results on spectral tests, and add those of $(d, z\hat{\,}i)$ 2nd degree tests for $2\leq i\leq 6$. The results are surprising. The random number sequences $\{v_1, v_2, \ldots\}$ generated by these $(d, z)$ generators cannot be said independent when taken $i=2, 3, \ldots$ steps apart. This conclusion does not lose its validity when 3rd to 6th degree spectral tests are revised after Nakazawa and Nakazawa (2014a). Please see also Nakazawa and Nakazawa (2015a, b), or Nakazawa (2015). It is obvious that the simple methods of generalized 2nd degree spectral tests form powerful sieves or barriers against unqualified generators.

As to the merit (2), noted above, the disclosure of examples will be the best way to comprehend. Recently, Nakazawa and Nakazawa (2016) gave a disclosure of excellent generators with the usable periods $T'\approx 2^{50}$, giving at the same their spectral tests in the form of an executable file. One member $(d, z)$ of disclosed generators has the usable period $T'\approx 2^{50.02}$ with the construction, $d=4576300165252117, z=1231824301612706.$ The processes to compute valuations $\rho_2(d, z\hat{\,}i)$ of the generalized 2nd degree tests for $i=1, 2, \ldots, 20$ and to compute valuations of 3rd to 6th degree spectral tests are given by executing the executable file. The computing time will be experienced in any Windows-type computers (inventors own no Mac); the noted generalized 2nd degree spectral tests for the present $(d, z)$ was finished within 15 seconds on an Intel I7-4770@3.40 GHz machine, while 3rd to 6th degree tests required about 60 hours=$2.16\times 10^5$ seconds. If a set $(d, z)$ is not passable in the generalized 2nd tests, then present invention enables us to dispense with unnecessary computing time, which is larger by more than $1.44\times 10^4$-fold.

It will also be appropriate to disclose the following clues to the successful discovery of noted 9 excellent generators.

First, the aim is fixed to realize $d\geq 2^{52}$, and odd prime sub-moduluses $d_1, d_2 \leq 2^{31}$ were set as targets. Second, starting from small odd primes with their primitive roots or their negatives as multipliers for sub-generators $(d_j, z_j)$ with $j=1, 2$, generalized 2nd degree spectral tests of $(d_j, (z_j)\hat{\,}i)$ were performed for $1\leq i\leq 12$, and M passers were outputted to files $F_j$, $j=1, 2$. Third to 6th degree spectral tests were skipped over. In principle the design can choose the case of distinct $F_1$ and $F_2$ or the case that they are identical; the choice here was the latter and $M>8000$ was somehow eked out. Then pairs of $(d_1, z_1)$ and $(d_2, z_2)$ with coprime $d_1$ and $d_2$ were chosen out of $F_1=F_2$, and the combined generator $(d=d_1 d_2, z)$ was constructed by Sun Tzu's theorem. Then generalized 2nd degree spectral tests of $(d, z\hat{\,}i)$ for $1\leq i\leq 6$ were performed on approximately $M^2/2>6.4\times 10^7$ relevant pairs, and passers are submitted finally to 3rd to 6th degree spectral tests. Computing processes were distributed onto 4 desktop computers in about 20 parallel threads to realize a primitive parallel computing. Total search processes took nearly a year to end up firmly with 9 excellent passer generators with $T'\geq 2^{50}$. These 8 passers among 9 are submitted to JPO for their utility model right. Please see Nakazawa and Nakazawa (2014b) for their partial disclosure. In the passing we note that the passer $(d, z)$ with the largest d requires only 15 seconds for its generalized 2nd degree tests of $(d, z\hat{\,}i)$ for $1\leq i\leq 20$. In contrast its total spectral tests requires 60 hours. If you have a computer available for this computing only, you will experience these data by yourself and feel how fast and efficient the generalized 2nd degree tests can be. It will not need much to say that this 60 hours is a very tiny portion in the gigantic computing time required for the exhaustive search of $M^2/2$ pairs.

Effects of the Invention

Below, we summarize remarkable technological discoveries and observations in items as suggested by the disclosures noted above.

First, specialists, who have simulation problems in their hands, will have respective needs for the length L of independence of random numbers. It is then significant for them to have the information what L may reliably be expected with a sequence emitted from a $(d, z)$ generator. It is a pity that L can only be as small as 10 at the best at present, but these data for sure improves the existing prior arts. In the experience of Nakazawa and Nakazawa (2014b) we recognize that a (d, z) generator should bear and be examined of their performances $\{\rho_2(d, z\hat{\ }i)| i=2, 3, \ldots \}$ of generalized 2nd degree spectral tests before the simulation. This will be the part of the product liability to random number generator suppliers.

Second, there exist, of course, applications that such knowledge on the range L of independence is rather insignificant, and only large periods (or massive numbers of random numbers) will matter just as in the cooling of power plants. In this regard we now have certainly good answers, say with GFSR random numbers using primitive polynomials on finite fields. However, as pure water is indispensable in certain technological purposes and non-pure water can never replace the role of pure water, random numbers with excellent statistics can never be replaced with random numbers with only gigantic periods. The well-known equidistribution properties of a GFSR generator is shared by all primitive polynomials, and do not help for the excellence of statistics of emitted random numbers for the usable length T'; we should perform tests exhaustively over all relevant primitive polynomials, but this is impossible. The present invention aims to produce pure water for $T'\approx 2^{50}$ which will suffice for some purposes of its own, and the generalized 2nd degree spectral tests of $(d, z\hat{\ }i)$ will be a very sharp, effective and helpful sieve to realize this aim.

Third, we should admit that successes disclosed here are yet not exclusive nor general enough. There may be devised other tactics to realize the aim. We should expect contributions from specialists, engineers or computer-oriented people. But one general feature of the procedures might be noted for sure. Even though generalized 2nd degree tests of $(d, z\hat{\ }i)$ makes selections by spectral tests faster, the total number $M^2/2 \approx 3.2\times 10^7$ candidates which by themselves has been chosen by stringent sieves of extended 2nd degree tests of sub-generators, resulted only in 9 passers. The probability of success of an arbitrary choice is all negligible. We are confirming here the fundamental recognition of Fishman and Moore (1986) again; we shall be unable to obtain an excellent generator (d, z) without the use of exhaustive tests using the form generalized in the 2nd degree. Further, the present Inventors could not find any passer without reforming 3rd to 6th degree spectral tests as discussed in Nakazawa and Nakazawa (2014a). This will prove that an excellent (d, z) generator will never be found by chance, without the use of the generalized 2nd degree spectral tests of $(d, z\hat{\ }i)$ for $2 \le i \le 6$ including the case i=1 of the prior arts and without the use of the reformed 3rd to 6th degree spectral tests.

In closing we discuss the relations of the present invention to prior arts. The following are now obvious. All inventions on (d, z) multiplicative congruential generators of the present Inventors prior to 2013 must be amended at least to include the generalized 2nd degree spectral tests of $(d, z\hat{\ }i)$ for $2 \le i \le 6$. They should further be amended in their 3rd to 6th degree spectral tests as Nakazawa and Nakazawa (2014a) shows, but we do not go into the subject here. Putting aside the framework of multiplicative congruential generators, there exist efforts to combine 2 or more sub-generators to form a generator with very long LCM periods, typically L'Ecuyer and Tezuka (1991) or Sakamoto and Morito (1996), including the review by Wang et al. (2011). These have a common structure to select multiplicative congruential sub-generators by spectral tests in forms which were standard at respective time points and to test combined generators by selected sets of empirical tests without the use of spectral tests. The present Inventors cannot help fearing that these types of constructions might be unable to give excellent generators. Above all, these methods cannot give clear and quantitative specifications of combined generators by their performances in (generalized) spectral tests, which will be problematic as product liability from the side of consumers. By the way, we may note here on the multiplicative congruential generator $(d=2\hat{\ }I, z)$ with a large power index I and a multiplier z=5 mod(8) with the ensured (usable) period T=T'=d/4. This is one of the classic forms of multiplicative congruential generators, but the design lacks the possibility to for d to be divide into 2 coprime factors and to ease the difficulties of computability of spectral tests by Sun Tzu's theorem. This construction of d should be avoided because they inevitably introduce correlations between consecutive random numbers; please see Nakazawa and Nakazawa (2008). It should also be avoided in view of the regularity of emitted random numbers in their lower bits.

Furthermore, FIG. 1 illustrates plots of consecutive 2-tuples emitted from (d, z) generators with a prime modulus d and its primitive root z for the 2nd degree valuation $\rho := \rho_2(d, z) \approx 1.05, 1.10, \ldots 1.30$. The outer square in FIG. 1 is drawn a little larger so as to include the unit square inside. FIG. 2 illustrates plots of consecutive 2-tuples emitted from (d, z) generators with a prime modulus d and its primitive root z for the 2nd degree valuation $\rho := \rho_2(d, z) \approx 1.35, 1.40, \ldots$. The outer square in FIG. 2 is drawn a little larger so as to include the unit square inside. Furthermore, FIG. 3 lists the performance of the top 6 generators chosen by Fishman and Moore (1986) for the Mersenne prime modulus $d=2^{31}-1$. The row named a shows the valuations given by them, and the row named 1/a shows inverse values of the row a and coincides by definition to the present $\rho = \rho_2(d, z)$. The row named b is the re-computation of row 1/a by the present inventors. The row named c shows valuations in the generalized 2nd test advocated in the present invention, $\rho_2(d, z\hat{\ }i)$ for $2 \le i \le 6$.

Fishman and Moore (1986) performed exhaustive tests of all primitive root multipliers on the Mersenne prime modulus $d=2^{31}-1$ and presented 5 top passers. FIG. 3 tells us, however, that they should all be rejected as multipliers giving excellent sample processes of a uniform and independent random numbers. This implies that more moduluses and their multipliers should be tested. The necessary procedures to this end are roughly as follows, within the restriction to the generalized 2nd degree tests of the present invention. We talk here on a (d, z) multiplicative congruential generator which may be one of sub-generators or the combined generator.

(A) Determine first the modulus d with the sufficient magnitude to realize the necessary period.

(B) Take $z'=z\hat{\ }i \mod(d)$ in the range $0<z'<d$, and start from the power index i=1.

(C) Let integer $y_2$ sweep in the range $0<y_2<2\hat{\ }(\frac{1}{2})3\hat{\ }(-\frac{1}{4})d\hat{\ }(\frac{1}{2})<1.07457d\hat{\ }(\frac{1}{2})$ and search the integer $y_1 = -z'y_2 \mod(d)$ in the range $0<|y_1|<1.07457d\hat{\ }(\frac{1}{2})$, which is unique if it exists. If such $y_1$ does not exist, move to the next $y_2$; otherwise compute $$\|f\|^2 := \|(y_1, y_2)\|^2 := (y_1)^2 + (y_2)^2,$$

compare $\|f\|^2$ with the recorded value; if smaller, let it be recorded anew and continue the search until the shortest $\|f_{min}\|>0$ is attained.

(D) Compute $\rho_2(d, z')=2\hat{\ }(\frac{1}{2})3\hat{\ }(\frac{1}{4})d\hat{\ }(\frac{1}{2})/\|f_{min}\|$, adopt z' passable if $\rho_2(d, z')<1.25$ is true, increase i by i=i+1, and if i is smaller than the assigned value $i_{max}$ (e.g. 6) go back to (B); otherwise record (d, z) as passable in the generalized 2nd degree test, increase the number m of the passer by m=m+1; if m<M is true for the prescribed value M, then reset i to 1, take new z and go to (B), or if the candidate multiplier for d is exhausted, take the next d with the first z for d, put i=1 and resume (B); otherwise exit with the list of (d, z) passer generators of total number M for the generalized 2nd degree tests.

(E) Hereafter, M passers of generalized 2nd degree tests should be submitted to (corrected) 3rd to 6th degree tests. Since this step is out of the present invention, we do not go into it.

(F) There may be imagined various forms to mount obtained excellent (d, z) generators on computers, say in the function library referenced from computer languages, as using a specifically designed ROM with the subroutine installed, or even as function subroutines written down by consumers so as to realize optimizations (say, for the use in parallel) in their simulation programs. Since the present Inventors are not particularly specialized in such problems, we leave those devices to respective consumers and specialists. We lay our standpoint here solely on the expeditor of excellent (d, z) generators, on the researcher of structures that may be searched or computed, or on the consumer who need to devise how to make the appropriate or the best use of the (d, z) generators mounted on the computer.

What is claimed is:

1. A computer implemented method, comprising:

constructing, by a computer processing system, a multiplicative congruential generator (d, z) that comprises an odd integer d called a modulus and an integer z coprime to d called a multiplier, wherein the multiplicative congruential generator starts from an arbitrarily given integer n coprime to d called a seed;

recursively generating, by the computer processing system, a sequence of integers $\{r_0, r_1, r_2, \ldots\}$ having congruence relationships comprising:

$r_0 \equiv n \bmod(d)$, $0 < r_0 < d$, and $r_k \equiv z r_{k-1} \bmod(d)$, $0 < r_k < d$, $k=1,2,3,\ldots$; and outputting a random number sequence $\{v_k := r_{k-1}/d | k=1, 2, \ldots\}$ to a memory of the computer processing system, wherein the computer processing system further selects (d, z) by a condition that a dual lattice for (d, z^i) of any integer i in the range $2 \le i \le 6$, defined as a totality of a dual vector f defined as a linear combination $f := m_1 f_1 + m_2 f_2$ of dual basis vectors $\{f_1 := (d, 0), f_2 := (-z^i, 1)\}$ with integer coefficients $m_1$ and $m_2$ and with length $\|f\| := \{[dm_1 - (z^i)m_2]^2 + (m_2)^2\}^{1/2}$, having a shortest non-zero vector $f_{min}$ satisfying: $\rho_d^{(2)}(z^i) := 2^{1/2} d^{1/2}/(3^{1/4} \|f_{min}\|) < 1.25$; and configuring a simulation executing on the computer processing system using one or more random numbers from the outputted random number sequence in the memory.

2. The computer implemented method of claim 1, wherein the random number sequence is a uniform and independent sequence of random numbers.

3. The computer implemented method of claim 1, wherein a period of the random number sequence is at least 2^50, each number random number in the sequence has a double precision, and consecutive random numbers in the sequence are independent over the period.

4. A non-transitory machine readable medium having instructions stored thereon, which when executed by a computer processing system, cause the computer processing system to perform a method comprising:

constructing, by the computer processing system, a multiplicative congruential generator (d, z) that comprises an odd integer d called a modulus and an integer z coprime to d called a multiplier, wherein the multiplicative congruential generator starts from an arbitrarily given integer n coprime to d called a seed;

recursively generating, by the computer processing system, a sequence of integers $\{r_0, r_1, r_2, \ldots\}$ having congruence relationships comprising:

$r_0 \equiv n \bmod(d)$, $0 < r_0 < d$, and $r_k \equiv z r_{k-1} \bmod(d)$, $0 < r_k < d$, $k=1,2,3,\ldots$; and outputting a random number sequence $\{v_k := r_{k-1}/d | k=1, 2, \ldots\}$ to a memory of the computer processing system, wherein the computer processing system further selects (d, z) by a condition that a dual lattice for (d, z^i) of any integer i in the range $2 \le i \le 6$, defined as a totality of a dual vector f defined as a linear combination $f := m_1 f_1 + m_2 f_2$ of dual basis vectors $\{f_1 := (d, 0), f_2 := (-z^i, 1)\}$ with integer coefficients $m_1$ and $m_2$ and with length $\|f\| := \{[dm_1 - (z^i)m_2]^2 + (m_2)^2\}^{1/2}$, having a shortest non-zero vector $f_{min}$ satisfying: $\rho_d^{(2)}(z^i) := 2^{1/2} d^{1/2}/(3^{1/4} \|f_{min}\|) < 1.25$; and configuring a simulation executing on the computer processing system using one or more random numbers from the outputted random number sequence in the memory.

5. The non-transitory machine readable medium of claim 4, wherein the random number sequence is a uniform and independent sequence of random numbers.

6. The non-transitory machine readable medium of claim 4, wherein a period of the random number sequence is at least 2^50, each number random number in the sequence has a double precision, and consecutive random numbers in the sequence are independent over the period.

* * * * *